US009544822B2

(12) United States Patent
Dudda et al.

(10) Patent No.: US 9,544,822 B2
(45) Date of Patent: Jan. 10, 2017

(54) HANDOVER SIGNALING ASSISTANCE

(71) Applicant: Telefonaktiebolaget L M Ericsson (publ), Stockholm (SE)

(72) Inventors: Torsten Dudda, Aachen (DE); Stefan Wager, Espoo (FI); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/761,394

(22) PCT Filed: Jan. 20, 2014

(86) PCT No.: PCT/EP2014/050995
§ 371 (c)(1),
(2) Date: Jul. 16, 2015

(87) PCT Pub. No.: WO2014/111557
PCT Pub. Date: Jul. 24, 2014

(65) Prior Publication Data
US 2015/0350969 A1 Dec. 3, 2015

Related U.S. Application Data

(60) Provisional application No. 61/754,166, filed on Jan. 18, 2013.

(51) Int. Cl.
*H04W 4/00* (2009.01)
*H04W 36/00* (2009.01)
(Continued)

(52) U.S. Cl.
CPC ..... *H04W 36/0055* (2013.01); *H04W 36/0005* (2013.01); *H04W 36/08* (2013.01);
(Continued)

(58) Field of Classification Search
CPC ............. H04W 36/0055; H04W 36/0005; H04W 36/165; H04W 88/02; H04W 88/08; H04W 36/08
See application file for complete search history.

(56) References Cited

U.S. PATENT DOCUMENTS 9,161,278 B2* 10/2015 Koo .................. H04W 36/20
2005/0250498 A1* 11/2005 Lim .................. H04W 36/26
455/436
(Continued)

FOREIGN PATENT DOCUMENTS

EP 2 306 769 A1 4/2011
EP 2 343 919 A2 7/2011
(Continued)

OTHER PUBLICATIONS

3GPP, Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.4.0 (Dec. 2012), 208 pp.

(Continued)

*Primary Examiner* — Clemence Han
(74) *Attorney, Agent, or Firm* — Myers Bigel, P.A.

(57) ABSTRACT

The present invention relates to base stations, methods in a base station, terminals and methods in a terminal for supporting a handover. The invention further relates to computer programs for implementing, in the respective nodes of a wireless network, functionality for supporting a handover. According to one embodiment, a method in a source base station for supporting a handover of a terminal from the source base station to a target base station is provided. The method includes sending to an assisting base station a request for assisting the handover, and communicating han- (Continued)

dover control information between the terminal and the source base station via the assisting base station.

26 Claims, 11 Drawing Sheets

(51) Int. Cl.
*H04W 88/08* (2009.01)
*H04W 88/02* (2009.01)
*H04W 36/08* (2009.01)
*H04W 36/16* (2009.01)

(52) U.S. Cl.
CPC .......... *H04W 36/165* (2013.01); *H04W 88/02* (2013.01); *H04W 88/08* (2013.01)

(56) References Cited

U.S. PATENT DOCUMENTS

| | | | |
|---|---|---|---|
| 2007/0015511 A1* | 1/2007 | Kwun | H04W 36/30 455/436 |
| 2011/0086639 A1* | 4/2011 | Kalervo Hamalainen | H04B 7/2606 455/436 |
| 2011/0170516 A1* | 7/2011 | Hu | H04W 36/0033 370/331 |
| 2011/0199919 A1* | 8/2011 | Lin | H04B 7/155 370/252 |
| 2011/0268088 A1* | 11/2011 | Lindskog | H04L 1/1874 370/331 |
| 2012/0100851 A1* | 4/2012 | Zheng | H04W 36/0094 455/436 |
| 2015/0092942 A1* | 4/2015 | Wager | H04L 63/061 380/270 |
| 2015/0237550 A1* | 8/2015 | Krisnaswamy | H04W 36/08 370/252 |

FOREIGN PATENT DOCUMENTS

WO WO 2012/087204 A1 6/2012
WO WO 2013/070127 A1 5/2013

OTHER PUBLICATIONS

3GPP, Technical Specification, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.1.0 (Sep. 2012), 325 pp.
3GPP, Technical Specification, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.3.0 (Dec. 2012), 141 pp.
3GPP, Technical Specification, "3rd Generation Partnership Project; Technical Specification Group Radio Access Network; Evolved Universal Terrestrial Radio Access (E-UTRA); Mobility enhancements in heterogeneous networks (Release 11)", 3GPP TS 36.839 V11.1.0 (Dec. 2012), 53 pp.
International Search Report and Written Opinion of the International Searching Authority, Application No. PCT/EP2014/050995, Jun. 24, 2014.
Written Opinion of the International Preliminary Examining Authority, Application No. PCT/EP2014/050995, Feb. 23, 2015.
International Preliminary Report on Patentability, Application No. PCT/EP2014/050995, May 21, 2015.

* cited by examiner

HANDOVER SIGNALING ASSISTANCE

CROSS REFERENCE TO RELATED APPLICATIONS

This application is a 35 U.S.C. §371 national stage application of PCT International Application No. PCT/EP2014/050995, filed on 20 Jan. 2014, which itself claims priority to U.S. provisional Application No. 61/754,166, filed 18 Jan. 2013, the disclosure and content of both of which are incorporated by reference herein in their entirety. The above-referenced PCT International Application was published in the English language as International Publication No. WO 2014/111557 A1 on 24 Jul. 2014.

TECHNICAL FIELD

The present invention relates to base stations, methods in a base station, terminals and methods in a terminal for supporting a handover. In particular, the invention relate to handover of a terminal from a source base station to a target base station wherein the handover is assisted by an assisting base station. The invention further relates to computer programs for implementing, in the respective nodes of a wireless network, functionality for supporting a handover.

INTRODUCTION

In a typical cellular network, also referred to as a wireless communication system, User Equipments (UEs), communicate via a Radio Access Network (RAN) to one or more core networks (CNs).

A user equipment is a mobile terminal by which a subscriber can access services offered by an operator's core network. The user equipments may be for example communication devices such as mobile telephones, cellular telephones, laptops or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The cellular network covers a geographical area which is divided into cell areas. Each cell area is served by a base station, e.g. a Radio Base Station (RBS), which sometimes may be referred to as e.g. "eNB", "eNodeB", "NodeB", "B node", or BTS (Base Transceiver Station), depending on the technology and terminology used.

The base stations may be of different classes such as e.g. macro eNodeB, home eNodeB or pico base station, based on transmission power and thereby also on cell size.

A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or eNBs, may be directly connected to one or more core networks.

UMTS is a third generation, 3G, mobile communication system, which evolved from the second generation, 2G, mobile communication system GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

In the context of this disclosure, a base station as described above will be referred to as a base station or a Radio Base Station (RBS). A user equipment as described above, will in this disclosure be referred to as a user equipment or a UE.

The expression Down Link (DL) will be used for the transmission path from the base station to the user equipment. The expression UpLink (UL) will be used for the transmission path in the opposite direction i.e. from the user equipment to the base station.

Cellular communication networks evolve towards higher data rates, together with improved capacity and coverage. In 3GPP, standardization body technologies like GSM, HSPA and LTE have been and are currently developed.

To provide for mobility in the cellular network, the cellular network must perform so called handovers when the user equipment moves from one cell to another. A handover means that there is a change of serving cell for the user equipment from a so called source cell to a so called target cell. There are mechanisms in the cellular network to identify which cells are candidate target cells for handover. Typically, the user equipment regularly performs measurements to monitor which cells provide coverage at its current location. The measurement result is sent to a serving base station of the source cell in so called measurement reports. These measurement reports may be used to trigger a handover to the target cell in due time before the user equipment moves out of coverage from the source cell.

If the handover is triggered too early, the user equipment may not be able to connect to the target cell and there is a high probability for oscillating handovers.

If the handover is triggered too late the serving base station of the source cell may not receive the measurement report used for handover triggering, or the user equipment may not be able to receive a handover command from the serving base station of the source cell. Due to this, the handover may not be performed which may eventually lead to the user equipment moving out of coverage from the source cell, detecting a radio rink failure, and losing its radio link connection to the cellular network, causing for example an ongoing call or a download to terminate prematurely.

LTE is a so called frequency re-use 1 capable system, i.e. performance requirements and standardized solutions are such that adjacent cells may re-use the same frequency for transmission.

A problem is that, since re-use 1 planning of frequency is used, for example handover situations may become challenging in terms of interference, as the target cell transmission interfere with source cell transmission, which may result in unsatisfactory transferal of uplink and/or downlink data, such as for example a measurement report or a handover command, which is necessary for performing the handover. Failed transmissions of data may hence lead to too early or too late handovers, and/or to oscillating handovers and handover failures.

The problems with interfering transmissions causing failed transmissions of data are further stressed by the introduction of so called Heterogeneous Networks.

In heterogeneous networks, high power base stations and low power base stations using the same frequency are deployed in the same area such that their coverage, or cells, in the cellular network overlap.

In view of the discussion above, it is an object to provide an improved and robust way of performing handovers in a cellular network. In particular, it is an object to increase the chances to correctly receive control messages that are relevant for a reliable handover procedure.

It is an object to provide improved methods and devices, such as base stations and UEs, for wireless communication, that support improved handover.

SUMMARY

According to one aspect of the invention, a method in a source base station for supporting a handover of a terminal from the source base station to a target base station is provided. The method comprises the following steps: Sending, to an assisting base station, a request for assisting the handover; and communicating handover control information between the terminal and the source base station via the assisting base station.

According to one aspect of the invention, a method in an assisting base station for supporting a handover of a terminal from a source base station to a target base station is provided. The method comprises the following steps: Receiving, from a source base station, a request for assisting the handover; and in case of a positive handover decision, Sending, to the terminal, handover control information received from the source base station and/or Sending, to the source base station handover control information received from the terminal.

According to one aspect of the invention a method in a terminal configured for communicating with a source base station and an assisting base station for supporting a handover of the terminal from the source base station to a target base station is provided. The method comprises the following step: Communicating handover control information between the terminal and the source base station via the assisting base station.

According to one aspect of the invention a source base station for supporting a handover of a terminal from the source base station to a target base station is provided. The source base station comprises a radio interface for communicating with the terminal; an interface for communicating with a target base station and an assisting base station; and a processor. The processor is configured to control the steps: Sending, to an assisting base station, a request for assisting the handover; and communicating handover control information (for example, measurement reports or handover commands) between the terminal and the source base station via the assisting base station.

According to one aspect of the invention an assisting base station for supporting a handover of a terminal from a source base station to a target base station is provided. The assisting base station comprises a radio interface for communicating with one or more terminals; an interface for communicating with one or more base stations; and a processor. The processor is configured to control the steps: Receiving, from a source base station, a request for assisting the handover; and in case of a positive handover decision, Sending, to the terminal, handover control information received from the source base station and/or Sending, to the source base station handover control information received from the terminal.

According to one aspect of the invention, a terminal is provided. The terminal comprises a radio interface for connecting to one or more base stations and a processor. The processor is configured to control the steps: Communicating handover control information between the terminal and a source base station via an assisting base station.

According to one aspect of the invention a computer program comprising program code to be executed by at least one processor of a base station is provided. Therein, the execution of the program code causes the base station to operate in accordance with an above method in a base station for supporting a handover.

According to one aspect of the invention, a computer program comprising program code to be executed by at least one processor of a terminal is provided, Therein, the execution of the program code causes the terminal to operate in accordance with an above method in a terminal for supporting a handover.

DETAILED DESCRIPTION

In the following, the invention will be explained in more detail by referring to exemplary embodiments and to the accompanying drawings. The illustrated embodiments relate to concepts for improving the handover performance in cellular systems, such as LTE. Thereby it is especially focused on scenarios where source and target cell operate on the same frequency.

In current LTE systems, the success of the handover procedure depends on successful transmission exchange of UE and eNB. In a heterogeneous network deployment possibly with multiple low power Pico eNBs deployed within the coverage area of a Macro eNB handover failures are more likely than in pure Macro-only deployments. This applies e.g. for scenarios where the UE changes the serving cell between the Pico nodes or between Macro and Pico nodes. Some embodiments provide a solution to this problem.

Some embodiments are described within the context of LTE, i.e. E-UTRAN. It should be understood that the problems and solutions described herein are equally applicable to wireless access networks and user-equipments (UEs) implementing other access technologies and standards. LTE is used as an example technology where the embodiments are suitable.

In the following it is focused on mobility concepts in LTE: Radio Resource Control, RRC (3GPP TS 36.331, e.g. V11.1.0), is the main signaling protocol for configuring, re-configuring and general connection handling in the LTE radio access network (E-UTRAN). RRC controls many functions such as connection setup, mobility, measurements, radio link failure and connection recovery. These functions are of relevance for some embodiments, and are therefore described in some further detail below.

A UE in LTE can be in two RRC states: RRC_CONNECTED and RRC_IDLE. In RRC_CONNECTED state, mobility is network-controlled based on e.g. measurements provided by the UE. I.e. the network decides when and to which cell an UE should be handed over, based on e.g. measurements provided by the UE. The network, i.e. the LTE radio base station (called eNB in E-UTRAN) configures various measurement events, thresholds etc based on which the UE then sends reports to the network, such that the network can make a wise decision to hand over the UE to a stronger cell as the UE moves away from the present cell. An LTE RRC handover procedure is presented in FIG. 10.1.2.1.1-1 of 3GPP TS 36.300 (e.g. V 11.4.0).

Figure 1:
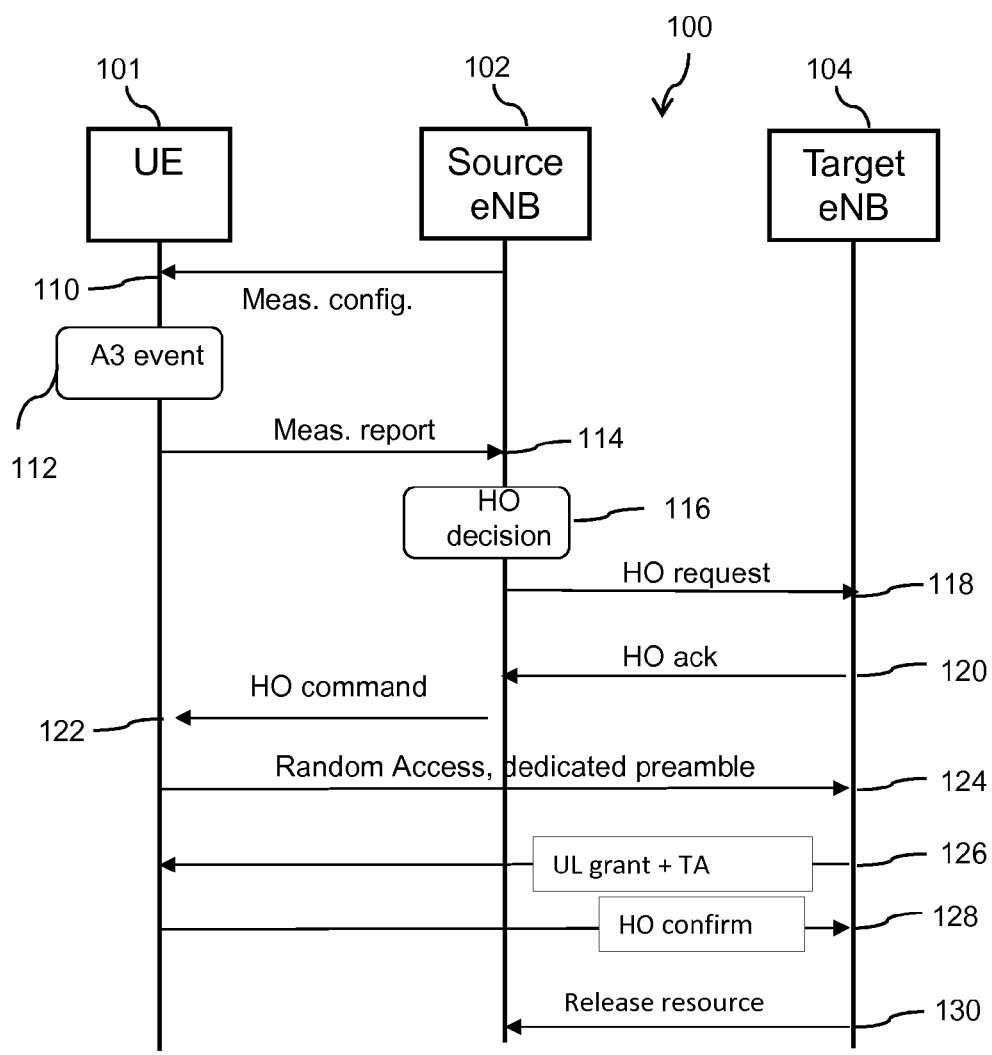
FIG. 1 shows a signaling diagram for illustrating an exemplary handover procedure.

FIG. 1 shows a signaling diagram for illustrating a simplified example of a handover procedure. Messages sent from one node to the other are indicated by arrows from one node to the other. An event or decision in a node is indicated by a box having rounded corners. In this Figure, a mobile network 100 is depicted which comprises a source eNodeB 102 and a target eNodeB 104. A UE 101 is connected to the source eNodeB 102. In step 110, a measurement configuration is sent from the source eNodeB 102 to the user equipment 101, the user equipment 101 may detect in a step 112 an A3 event, e.g. an event according to which a signal strength or signal quality of the target eNodeB 104 may be detected and/or compared to a signal strength or signal quality of the source eNodeB 102. In step 114 a respective measurement report is sent from the UE 101 to the source eNodeB 102. After a corresponding handover decision in a step 116, the source eNodeB 102 sends a handover request in a step 118 to the target eNodeB 104, which in turn sends a handover acknowledgement in a step 120 to the source eNodeB 102. The source eNodeB 102 then sends in a step 122 a handover command to the user equipment 101, which performs in a step 124 a random access procedure in which a dedicated preamble is transmitted to the target eNodeB 104. Further arrows 126, 128, 130 relate to a completion of the handover procedure covering steps of granting Uplink resources, confirming the handover and releasing certain resources.

In general, the HO command 122 can in fact be prepared in the Target eNB 104, but the message transmitted via the Source eNB 102. I.e. the UE 101 sees that the message comes from the Source eNB.

In RRC_IDLE, mobility is handled by UE-based cell-selection, where a nomadic UE selects the "best" cell to camp on, based e.g. on various specified criteria and parameters that are broadcasted in the cells. For example, various cells or frequency layers could be prioritized over other, such that the UE tries to camp on a particular cell as long as the measured quality of a beacon or pilot in that cell is a threshold better than some other beacon or pilot received from other cells.

Some embodiments are primarily focusing on problems associated with network-controlled mobility as described above, i.e. for an LTE UE in RRC_CONNECTED state. The problems associated with failing handovers are therefore described in further detail below.

In a regular situation, and when an RRC_CONNECTED UE is moving out from the coverage of a first cell (also called source cell), it should be handed over to a neighboring cell (also called target cell or second cell) before loosing the connection to the first cell. I.e. it is desirable that the connection is maintained with no or minimal disruption throughout the handover, such that the end-user is unaware of the ongoing handover. In order to succeed with this, it is necessary that the measurement report that indicates the need for mobility is transmitted by the UE and received by the Source eNB, and the source eNB has sufficient time to prepare the handover to the target cell (by, among other things, requesting a handover from the Target eNB controlling the target cell), and the UE receives the handover command message from the network, as prepared by the target eNB in control of the target cell and sent via the source cell to the UE, see FIG. 1.

In addition, and in order for the handover to be successful, the UE must finally succeed in establishing a connection to the target cell, which in LTE requires a successful random access request in the target cell, and a subsequent HO complete message. (It should be noted that specifications may differ somewhat in the naming of messages. This does not limit the applicability of the embodiments).

In order to succeed all this, it is necessary that the sequence of events leading to a successful handover is started sufficiently early, so that the radio link to the first cell (over which this signaling takes place) does not deteriorate too much before completion of the signaling. If such deterioration happens before the handover signaling is completed in the source cell (i.e. first cell), then the handover is likely to fail. Such handover failures are clearly not desirable. The current RRC specification therefore provides various triggers, timers, and thresholds in order to adequately configure measurements, such that the need for handovers can be detected reliably, and sufficiently early.

In FIG. 1, the exemplified measurement report 114 is triggered by a so called A3 event (in short: A neighbor cell is found to be an offset better than the current serving cell). It should be noted that there are multiple events that can trigger a report.

It may occur that a UE loses coverage to the cell that the UE is currently connected to. This could occur in a situation when a UE enters a fading dip, or that a handover was needed as described above, but the handover failed for one or another reason. This is particularly true if the "handover region" is very short. By constantly monitoring the radio link quality, e.g. on the physical layer as described in 3GPP TS 36.300 (e.g. V 11.4.0), TS 36.331 (e.g. V 11.1.0) and TS 36.133 (e.g. V11.3.0), the UE itself is able to declare a radio link failure and autonomously start a RRC re-establishment procedure. If the re-establishment is successful (which depends, among other things, if the selected cell and the eNB controlling that cell was prepared to maintain the connection to the UE), then the connection between the UE and the eNB can resume. A failure of a re-establishment means that the UE goes to RRC_IDLE and the connection is released. To continue communication, a brand new RRC connection has then to be requested and established.

Figure 2:
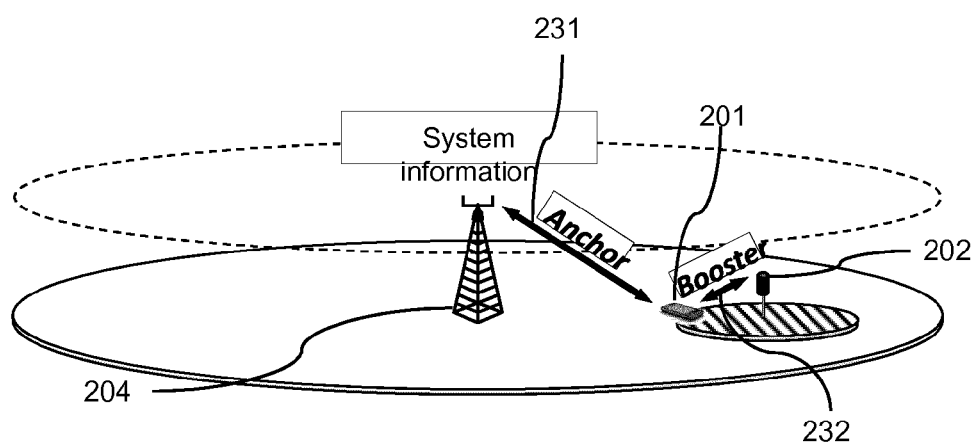
FIG. 2 schematically illustrates an exemplary scenario in which a terminal is in a dual connectivity to an anchor and a booster.

Next, it is focused on dual connectivity and RRC diversity. FIG. 2 illustrates a dual connectivity of a terminal/UE 201 to an anchor and a booster, i.e. a UE 201 maintains simultaneous connections 231 and 232 to anchor and booster nodes 204 and 202. An anchor may be seen as a base station 204 providing a primary connection 231 between the anchor base station 204 and the UE. A booster may be seen as a base station 202 providing a secondary connection 232 between the booster base station 202 and the UE 201. The Macro base station 204 may broadcast system information. Dual connectivity is a feature defined from the UE perspective wherein the UE may simultaneously receive and transmit to at least two different network points, e.g. base station 204 and 202. Here, the term "booster" may denote that a performance of a UE in terms of its data peak rate may be improved, since user plane data may be additionally transmitted via the booster. To this end, a transmission frequency employed by the anchor may be different from a transmission frequency employed by the booster.

Dual connectivity is one of the features that are discussed within the umbrella work of small cell enhancements within 3GPP Rel-12.

Dual connectivity is defined for the case when the aggregated network points operate on the same or separate frequency. Each network point that the UE is aggregating may define a stand-alone cell or it may not define a stand-alone cell. It is further foreseen that from the UE perspective, the UE may apply some form of Time Division Multiplex (TDM) scheme between the different network points that the UE is aggregating. This implies that the communication on the physical layer to and from the different aggregated network points may not be truly simultaneous.

Dual connectivity as a feature bears many similarities with carrier aggregation and CoMP (Coordinated Multipoint); the main differentiating factor is that dual connectivity is designed considering a relaxed backhaul and less stringent requirements on synchronization requirements between the network points. This is in contrast to carrier aggregation and CoMP wherein tight synchronization and a low-delay backhaul are assumed between connected network points.

Examples of features that dual connectivity will allow in the network are, RRC diversity (e.g. handover (HO) command from source and/or target); Radio Link Failure (RLF) robustness (failure only when both links fail); Decoupled UL/DL (UL to LPN, DL from macro); Aggregation of macro anchor carrier and LPN data booster(s); Selective Handover (e.g., data from/to multiple nodes); Hide UE mobility between small cells from Core Network (CN) with C-plane in macro; Network Sharing (Operators might want to always keep the control plane and Voice Over IP (VoIP) terminated in their own macro, but may be willing to offload best effort traffic to a shared network).

A UE in dual connectivity maintains simultaneous connections to anchor and booster nodes. As the name implies, the anchor node terminates the control plane connection towards the UE and is thus the controlling node of the UE. The UE also reads system information from the anchor. In addition to the anchor, the UE may be connected to one or several booster nodes for added user plane support.

The anchor and booster roles are defined from a UE point of view. This means that a node that acts as an anchor to one UE may act as booster to another UE. Similarly, though the UE reads the system information from the anchor node, a node acting as a booster to one UE, may or may not distribute system information to another UE.

Figure 3:
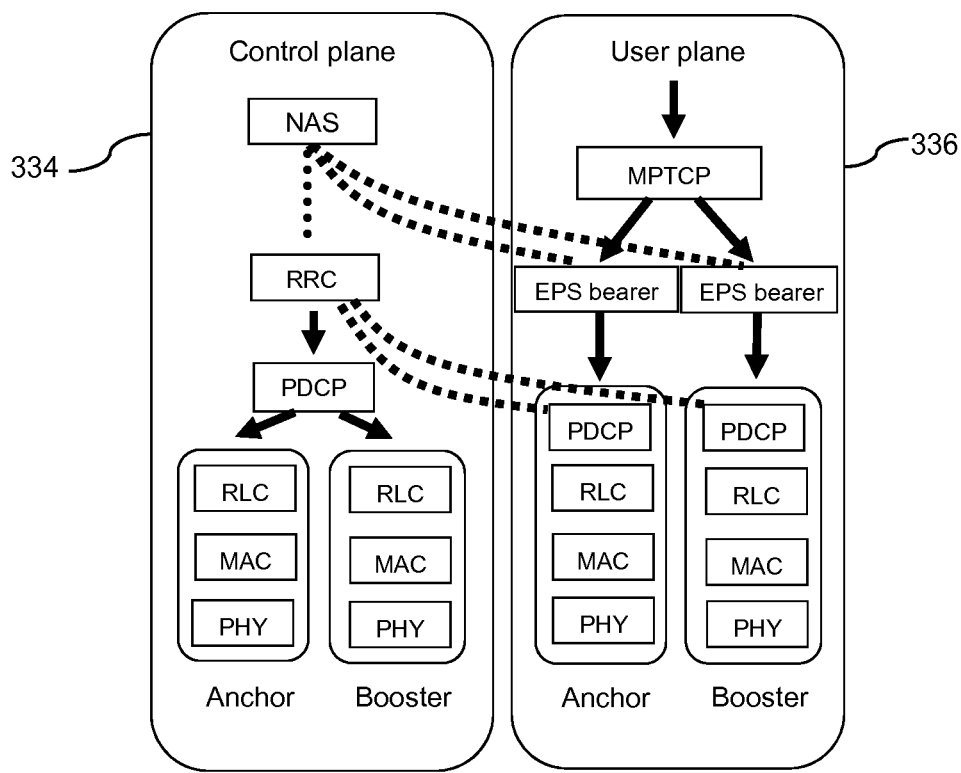
FIG. 3 schematically illustrates an example of a protocol architecture for a control and user plane termination.
Figure 4:
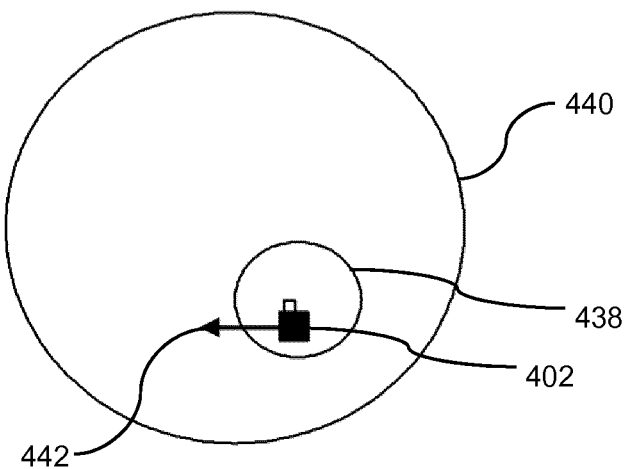
FIG. 4 schematically illustrates an exemplary scenario in which a UE is moving out from a Pico into a Macro area.

FIG. 4 illustrates a control and user plane termination in an anchor node and a booster node. This protocol architecture may represent an exemplary protocol termination compliant with dual connectivity and RRC diversity. The protocol architecture shown in FIG. 3 is proposed as a way forward for realizing dual connectivity in LTE Rel-12 in deployments with relaxed backhaul requirements. In the user plane 336 a distributed PDCP/RLC approach is taken where the booster and anchor terminate the user planes 334 of their respective bearers, with a possibility to realize user plane aggregation via Multipath Transmission Control Protocol (MPTCP), which may offer a split of traffic to several connections. In the control plane 343, the RRC and Packet Data Convergence Protocol (PDCP) are centralized at the anchor, with a possibility to route RRC messages via the anchor, the booster, or even simultaneously at both links. For ease of completeness, "NAS" may represent a Non Access Stratum protocol layer, "RLC" may represent a Radio Resource Control protocol layer, "MAC" may represent Medium Access Control protocol layer, and "PHYS" may represent a Physical layer.

In a further exemplary protocol termination enabling dual connectivity and RRC diversity, RRC is terminated in the anchor node, and PDCP is available both for the anchor node and the booster node. Next, it is focused on denser networks and handover scenarios: The recent and rapid uptake of Mobile Broadband has led to a need for increasing the capacity of cellular networks. One solution to achieve such a capacity increase is to use denser networks consisting of several "layers" of cells with different "sizes": Macro cells ensure large coverage with cells encompassing large areas, while micro-, pico- and even femto-cells are deployed in hot-spot areas where there is a large demand for capacity. Those cells typically provide connectivity in a much smaller area, but by adding additional cells (and radio base-stations controlling those cells), capacity is increased as the new cells off-load the macros.

The different "layers" of cells can be deployed on the same carrier (i.e. in a reuse-1 fashion), the small-cells could be deployed on a different carrier, and the different cells on the various layers could even be deployed using different technologies (e.g. 3H/HSPA on the macro- and micro-layer, and LTE on the pico-layer as one non-exclusive example).

It has also been found that such Heterogeneous Networks may result in an increased rate of handover failures, as briefly discussed above. One reason is that the handover region in Heterogeneous Networks may be very short, meaning that the handover might fail since the UE lost coverage to the source cell before the handover to a target cell could be completed. For example, when a UE leaves a pico-cell, it may happen that the coverage border of the pico is so sharp, that the UE fails to receive any handover command towards a macro before loosing coverage to the pico, see e.g. FIG. 4. Similar problems could occur when a UE connected to a macro suddenly enters a pico on the same carrier: It could now happen that the control channels of the pico interferes with the signals that the UE needs to receive from the macro in order to complete the handover, and the handover thus fails. In order to investigate the consequences of increased handover failures and solutions to mitigate those, 3GPP is currently working on evaluations and technical solutions for amendments, as described in TR 36.839 (e.g. V 11.1.0).

FIG. 4 illustrates a UE 402 moving out from a pico cell area of a pico cell 438 into a macro cell area of a macro cell 440. A movement direction of the user equipment 402 is indicated by an arrow 442. This figure may illustrate one of several typical scenarios for a handover of the UE 402.

Figure 5:
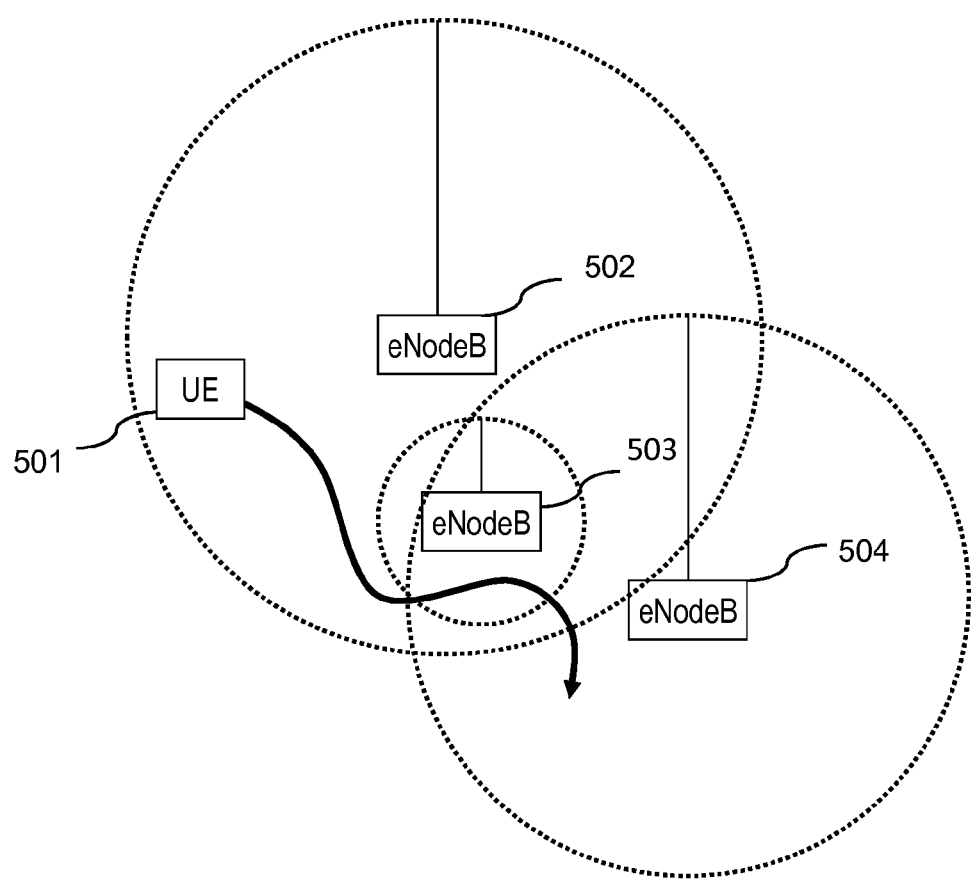
FIG. 5 schematically illustrates handover scenarios of a UE from a source eNodeB to a target eNodeB in a mobile communications network according to the 3GPP LTE standard.

A particular handover scenario is described hereinafter with respect to FIGS. 5 and 6. In FIG. 5, the UE 501 is moving within a cell of the first eNodeB 502 with a certain velocity. The cell is indicated with a dotted line in FIG. 5 and marks the coverage of the first eNodeB 502. In other words: the signal level of the first eNodeB 502 falls below a certain threshold at the borders of the respective cell.

Because the UE 502 moves out of the cell of the first eNodeB 502, it should be handed over to a neighbouring cell of a further eNodeB 503. This cell is also referred to as target cell. The handover should occur before losing the connection between the UE 501 and the first eNodeB 502. It can be desirable that the connection is maintained with no or minimal disruption throughout the handover. No or minimal disruption may refer to the user of the UE 501 being unaware of the ongoing handover. In the embodiment of FIG. 5, the further eNodeB 503 is a pico access node of a heterogeneous network.

A handover may involve a number of steps. Initially, a measurement report may be transmitted from the UE 501 to the first eNodeB 502. For example, the measurement report may be transmitted from the UE 501 to the first eNodeB 502 in response to a so-called A3 event. Such an A3 event may refer to the situation that the signal level of the further eNodeB 503 is larger by a predefined amount that the signal level of the first eNodeB 502 to which the UE 501 is connected. Based on this, the first eNodeB 502 may determine a need for performing the handover in the handover decision. If the handover is required, the first eNodeB 502 may initiate preparation of the handover to the further eNodeB 503. This may include, e.g., requesting a handover from the further eNodeB 503. Then, a Handover Command message may be transmitted from the first eNodeB 502 to the UE 501 which commands the UE 501 to execute the handover from the first eNodeB 502 to the further eNodeB 503.

In response to the received Handover Command message, the UE 501 establishes a connection to the further eNodeB 503. If the transmission reliability of a radio interface between the UE 501 and the first eNodeB 502 deteriorates significantly during the handover procedure as described above, there is a likelihood of a failed handover. In other words, the handover may not successfully complete and even the connection may be lost. For example, according to 3GPP TS 36.300 (e.g. V 11.4.0), timers, timestamps, and thresholds are employed in order to adequately configure measurements, such that the need for the handovers is detected sufficiently early before the radio interface between the UE 501 and the first eNodeB 502 deteriorates significantly.

Another reason for a deteriorated radio interface may be spectral interference encountered during the handover. In the scenario of FIG. 5, a second eNodeB 504 is present. The second eNodeB 504 can cause spectral interference with, both, the first eNodeB 502 and the further eNodeB 503. Likewise, the first eNodeB 502 and/or the further eNodeB 503 can cause spectral interference during the handover.

It may occur that a UE 501 loses connection to the first eNodeB 502, e.g., when the UE 501 enters a fading dip or if the handover fails as set forth above due to the impaired radio interface between the UE 501 and the first eNodeB 502. This is particularly true if a handover region is very small. A handover region may be defined as the region where, both, a signal level of the first eNodeB 502 to which the UE 501 is connected, as well as a signal level of the further eNodeB 503 to which the UE 501 is about to connect, are within a predefined range.

Figure 6:
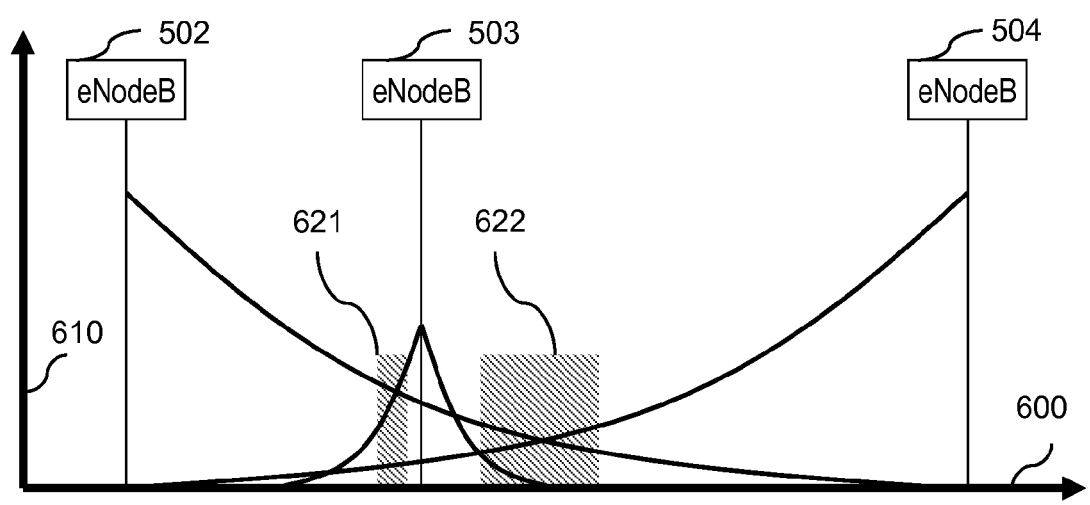
FIG. 6 schematically illustrates an example of signal levels of the source and target access nodes and a further interfering access node based on the exemplary scenarios illustrated in FIG. 5.

Such a situation is illustrated in FIG. 6. FIG. 6 illustrates the signal level 610 for various positions 600. A maximum signal level is obtained at the position of the respective eNodeBs 502, 503, 504. In FIG. 6, two handover regions are illustrated by shaded areas 621 and 622. Within the handover regions, a handover is likely to occur. As can be seen from FIG. 6, the handover region 621 between the first eNodeB 502 and the further eNodeB 503 is smaller than the handover region 622 between the first eNodeB 502 and the second eNodeB 504. From FIG. 6 it is apparent that in the handover region 621 between the first eNodeB 502 and the further eNodeB 503, the signal level 610 of the second eNodeB 504 is significant and may, therefore, cause spectral interference.

Figure 7:
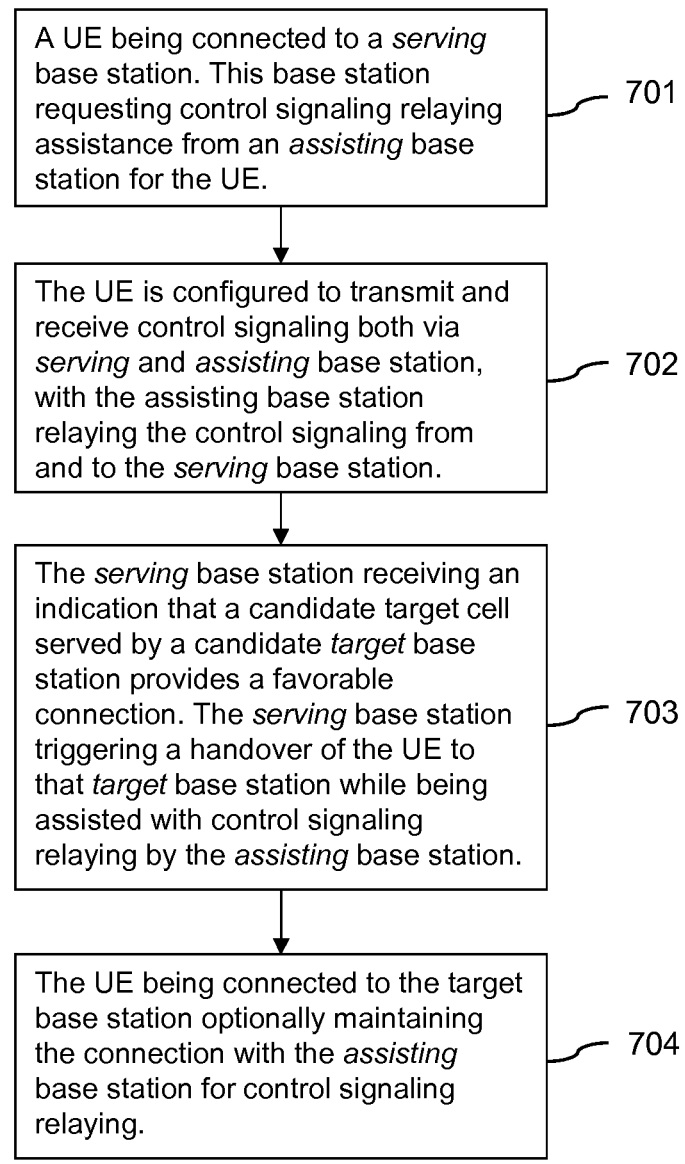
FIG. 7 shows a flow chart for illustrating a method according to an embodiment of the invention.

FIG. 7 shows a flow chart for illustrating a method according to certain embodiments. Some embodiments are based on the assumption that the UE can communicate independently via two maintained connections. Some embodiments provide a solution to improve the handover performance and/or transmission robustness by assisting the handover message exchange between UE and source cell (source base station) with a second connection between UE and an assisting cell (assisting base station). This way, possible handover failures and/or handover command transmission failures inherent in a legacy procedure where the UE is only connected to the source cell can be avoided. New signaling procedures between source, target and assisting eNB enable this functionality.

In the example as illustrated in FIG. 7, in a step 701, a UE is connected to a serving base station. This base station requests control signaling relaying assistance from an assisting base station for the UE. In a step 702, the UE is configured to transmit and receive control signaling both via serving and assisting base station. The assisting base station relays the control signaling from and to the serving base station (e.g. the control signaling between UE and serving base station is relayed by the assisting base station). In a step 703, the serving base station receives an indication that a candidate target cell served by a candidate target base station provides a favorable connection. The serving base station triggers a handover of the UE to that target base station while being assisted with control signaling relaying by the assisting base station. In a step 704, the UE is connected to the target base station. Optionally the UE maintains the connection with the assisting base station for control signaling relaying.

Figure 8:
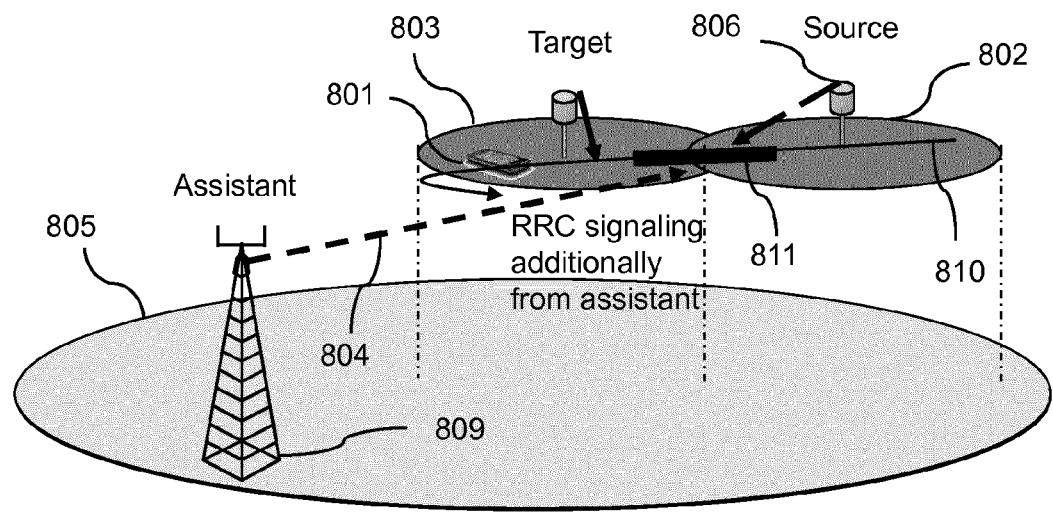
FIG. 8 schematically illustrates an exemplary handover scenario according to some embodiments of the invention.
Figure 9:
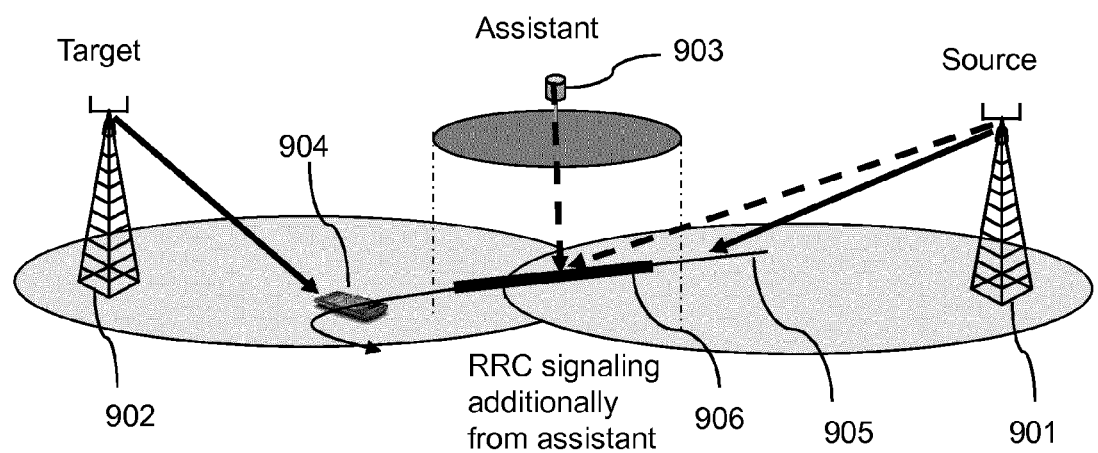
FIG. 9 schematically illustrates an exemplary handover scenario according to some embodiments of the invention.

FIGS. 8 and 9 schematically illustrate exemplary handover scenarios according to some embodiments. Some embodiments are based on the assumption that the UE can communicate independently via two maintained connections. The disclosure provides solutions to improve the handover performance (transmission robustness) by assisting the handover message exchange between UE and source cell with a second connection between UE and an assisting cell. This way, possible handover failures inherent in the legacy procedure where the UE is only connected to the source cell can be avoided. A particularly promising scenario is that the assisting cell operates on a separate frequency than target and/or source cell, thus interference for the handover message exchanges between source and target cell can be avoided. In the case where source and assisting cell operate on the same frequency, interference can e.g. be avoided in a lower level time domain transmission resource partitioning.

FIG. 8 and FIG. 9 show two exemplary scenarios where this functionality is useful. The scenario in FIG. 8 comprises a source base station 806, a target base station 807 and a macro base station 809. A UE 801 is connected to a Pico cell 802 and moves towards the coverage area of another Pico cell 803 (possible operating on the same frequency). For example, the UE 801 moves along the path 810 and comes across the handover region 811. Due to interference between the cells involved in the handover, especially for source cells (e.g. possibly also cells of different transmit power) artificially expanded (by cell selection offsets, CSO), the handover between the cells 802 and 803 is likely to fail. Therefore, assuming the UE 801 is able to receive and transmit handover related messages via a second connection 804 to a Macro cell 805 (possibly operating on another frequency) successful handover message transmission can be improved.

The scenario in FIG. 9 comprises a macro source base station 901, a macro target base station 902 and an assisting pico base station 903. A UE 904 may move along the path 905 and come across a handover region 906. The arrows may indicate certain connections between the respective base station and the UE. For example control signaling such as RRC signaling as discussed with respect to FIG. 1, may be transmitted via this connection. FIG. 9 shows a case similar to the ones of FIG. 8. However, a handover between two Macro cells which is assisted by a Pico cell is considered.

Other embodiments are not limited to the scenarios described in FIG. 8 and FIG. 9. Further scenarios can be thought of, e.g. a handover between Pico and Macro cell operating on the same frequency assisted by another cell operating on a different frequency. This way, higher handover thresholds (cell range expansion) can be chosen without negative impact of the handover performance. Another scenario would be e.g. an inter-frequency handover situation where the handover is assisted by another node operating on e.g. the frequency of the source cell, thus interference to the handover messages from the target cell is avoided.

In some embodiments we refer to RRC anchor and RRC relay, where RRC anchor will describe the eNB terminating the RRC protocol in the E-UTRAN, and the RRC relay is an eNB acting as a relay which is forwarding RRC messages from/to the RRC anchor at the network side via X2 backhaul and to the UE. Important for these embodiments is that the RRC anchor eNB is able and responsible to communicate with other eNBs via X2 upon reception of RRC messages, while the RRC relay is oblivious about content of the RRC messages it is forwarding. Note that also other protocols of the protocol stack, e.g. PDCP, may be centralized in the RRC anchor eNB, so their PDUs may be forwarded via the relaying eNB.

Figure 10:
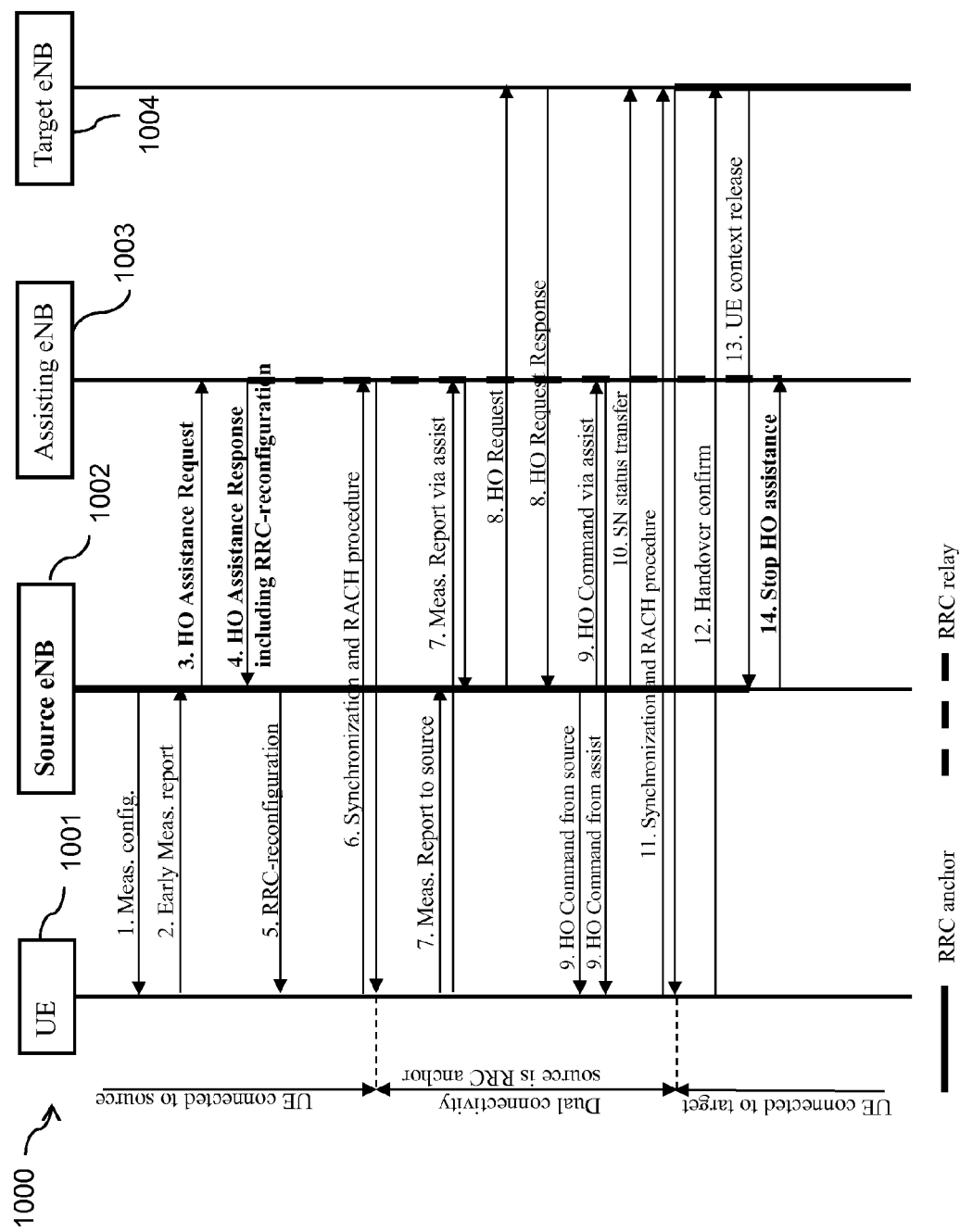
FIG. 10 shows a signaling diagram for illustrating a method according to an embodiment of the invention.

FIG. 10 shows an exemplary signaling diagram of a method according to an embodiment. In FIG. 10, a wireless network 1000 comprises a user equipment 1001, a source eNB 1002, a assisting eNB 1003, and a target eNodeB 1004. Steps in the signaling diagram of FIG. 10 are labelled by integer numbers. RRC anchor functionality is indicated by a bold solid line. RRV relay functionality is indicated by a bold dashed line. The different messages and steps are presented at first, further aspects of the respective steps are described thereafter.

According to FIG. 10, in a step 1, a measurement configuration is sent from the source eNB 1002 to the UE 1001. In a step 2, an early measurement report is sent from the UE 1001 to the source eNB 1002. In a step 3, a handover assistance request is sent from the source eNB 1002 to the assisting eNB 1003. In a step 4, an handover assistance response including RRC-reconfiguration is sent from the assisting eNB 1003 to the source eNB 1002. In a step 5, the RRC-reconfiguration is sent from the source eNB 1002 to the UE 1001. In a step 6, a synchronization and RACH procedure is performed between UE 1001 and the assisting eNB 1003.

In a step 7, a measurement report is sent from UE 1001 to source eNB 1002 and to assisting eNB 1003. In a step 8, a handover request is sent from the source eNB 1002 to the target eNB 1004. The target eNB sends a handover request response to the source eNB 1002. In step 9, a handover command is sent from source eNB 1002 to the UE 1001 and from the source eNB 1002 via the assisting eNB 1003 to the UE 1001. In step 10, a SN status is transferred from source eNB 1002 to target eNB 1004.

In a step 11, a synchronization and RACH procedure is performed between UE 1001 and the target eNB 1004. In a step 12, the UE 1001 confirms the handover to the target eNB 1004. In step 13, the target eNB 1004 instructs the source eNB to release the UE context. In step 14, the source eNB 1002 requests the assisting eNodeB 1003 to stop handover assistance.

In this example, up to step 6, the UE 1001 is connected to the source eNB 1002. From step 7 to 11, the UE is in dual connectivity, i.e. connected to source eNB 1002 and assisting eNB 1003. From step 12 on, the UE 1001 is connected to the target eNB 1004.

The above mentioned steps and messages are examples and refer to several concepts that are independent of each other. Several of the messages may be seen to be optional or may not relate to a particular independent concept.

In the example of FIG. 10, an RRC anchor point is in the source base station 1002 which is in dual connectivity mode. In FIG. 10 we see that the UE 1001 is configured with measurement configuration by the source eNB 1002 (step 1), so it will send a measurement report to the source eNB 1002 when the corresponding conditions become true (step 2). Usually the measurement is related to the signal level received from source, target, and/or assisting eNB 1002, 1004, 1003. It should be triggered prior to a potential handover between source and target and can optionally include measurements of the assisting eNB 1003.

Upon reception, the source eNB 1002 may indicate to the assisting eNB 1003 that it would like to establish RRC diversity for this UE 1001, i.e. the assisting eNB 1003 shall act as an RRC-relay for the UE 1001, which is indicated by (step 3). In RRC diversity mode, this node is able to provide handover assistance to the UE 1001. In the example in FIG. 10 the source eNB 1002 will remain the RRC anchor point for the UE 1001, which's information will be included in the message of step 3 (e.g. a flag indicating if the RRC anchor point remains in source eNB 1002). The assisting eNB 1003 acknowledges the request and sends a RRC-reconfiguration message via the source eNB 1002 to the UE 1001 in steps 4 and 5. Upon reception the UE 1001 will enable RRC diversity and start a synchronization and RACH procedure to the assisting cell in step 6. In RRC diversity mode, RRC signaling messages will be transmitted and received by both source eNB 1002 and assisting eNB 1003, but the RRC anchor point on the network side will be in source cell, so RRC/PDCP PDUs in the anchor node will be relayed via the backhaul between source eNB 1002 and/or assisting eNB 1003. Generally, the UE can be oblivious about where the RRC anchor point resides in the network.

Parts of the RRC diversity assistance request procedure are described in application PCT/SE2011/051344, entitled 'Methods and arrangement for handling a data transferal in a cellular network' by W. Mueller et al. which is incorporated herewith by reference.

Upon reception of a measurement report indicating that the UE 1001 should be handed over from the source cell to the target cell, step 7, the source eNB 1002 will request a handover to the target eNB 1004 in step 8, and upon reception of the corresponding RRC-reconfiguration from the target eNB 1004 the source eNB 1002 will relay this RRC reconfiguration (handover command) transparently to the UE 1001 in step 9. Since RRC diversity mode is active, the RRC/PDCP PDUs of the corresponding RRC-message need to be duplicated and forwarded via backhaul to assisting eNB 1003 which further forwards the message to the UE.

This duplication is not necessarily a requirement. RRC diversity could also be implemented by using only one of the link for certain RRC/PDCP PDUs. The source eNB 1002 will transfer the sequence number status to the target eNB 1004 and start data forwarding (Rel. 8 procedure) in step 10. The UE 1001 will start upon reception of the handover command the synchronization and RACH procedure to connect to the target eNB in step 11 and eventually confirm the handover to the target eNB in step 12. Then the target eNB 1004 will issue the source eNB 1002 to release the UE's RRC context in step 13.

At this point, also the RRC relaying status of the assisting eNB 1003 may be stopped and removed which is indicated from source to assisting eNB by in step 14. Alternatively this can be indicated by the target eNB 1004 as further described with respect to FIG. 12.

Figure 11:
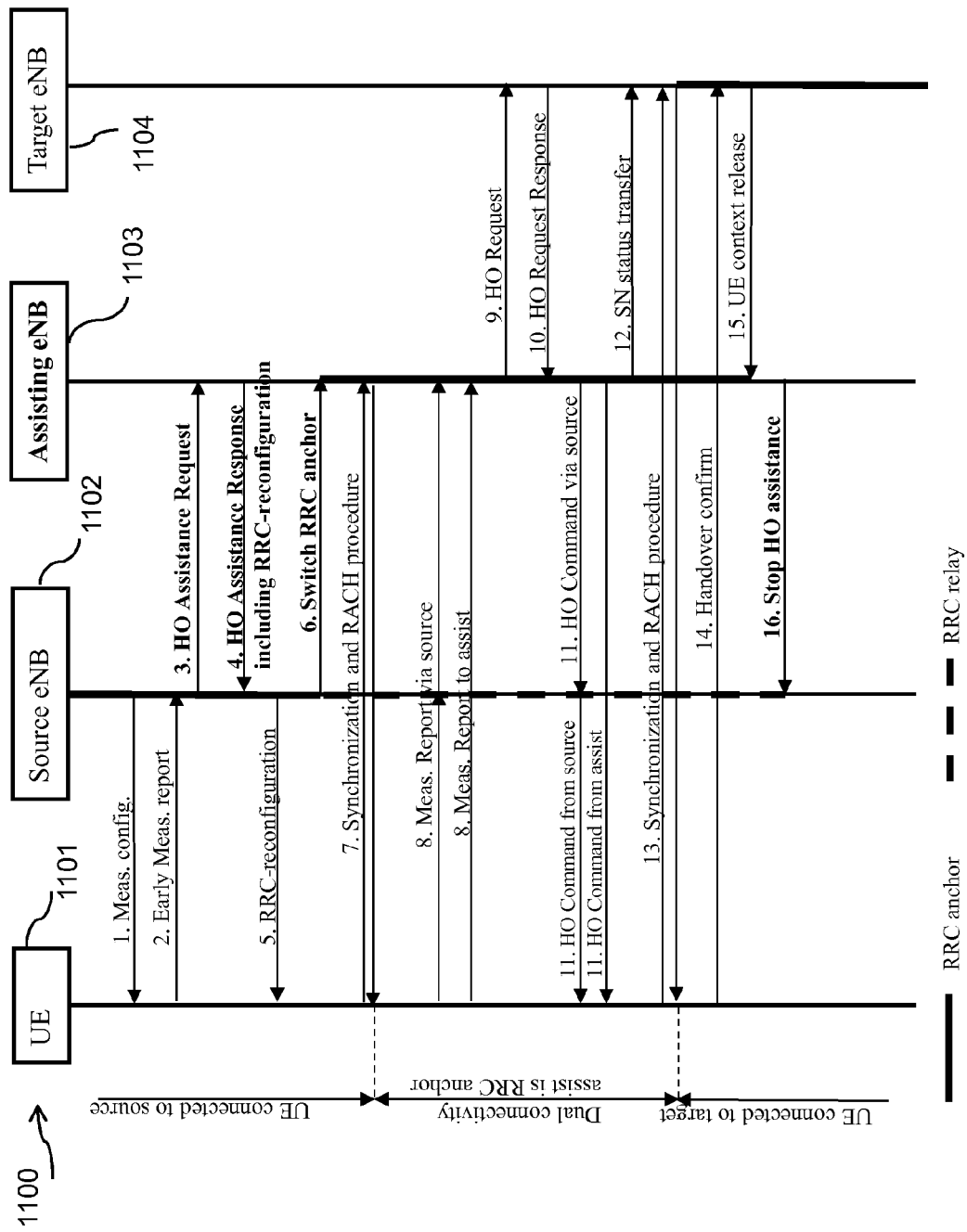
FIG. 11 shows a signaling diagram for illustrating a method according to an embodiment of the invention.

FIG. 11 shows another exemplary signaling diagram of a method according to an embodiment. In FIG. 11, a wireless network 1100 comprises a user equipment 1101, a source eNB 1102, an assisting eNB 1103, and a target eNodeB 1104. Steps in the signaling diagram of FIG. 11 are labelled by integer numbers. RRC anchor functionality is indicated by a bold solid line. RRV relay functionality is indicated by a bold dashed line. The different messages and steps are presented first, further aspects of the respective steps are described thereafter.

Steps 1 to 5 correspond to the respective steps in FIG. 10. A new step 6 is inserted, according to which the source eNB 1102 requests the assisting eNB 1103 RRC anchor. Step 7 corresponds to step 6 in FIG. 10. In step 8, the measurement report is send from the UE 1101 to the assisting e eNB 1103 directly and also via the source eNB 1102. In step 9, the assisting eNB 1103 sends a handover request to the target eNB 1104, which sends a response to the handover request to the assisting eNB in step 10. In step 11, the handover command is sent from the assisting eNB 1103 via the source eNB 1102 and also directly to the UE 1101. In step 10, the SN status is transferred from assisting eNB 1103 to target eNB 1104. Step 13 corresponds to step 11 in FIG. 10. Step 14 corresponds to step 12 in FIG. 10. In step 15, the target eNB 1104 requests the assisting eNB 1103 to release the UE context. In step 16, the assisting eNB 1103 requests the source eNB 1102 to stop handover assistance.

In this example, up to step 7, the UE 1101 is connected to the source eNB 1102. From step 8 to 13, the UE is in dual connectivity, i.e. connected to source eNB 1102 and assisting eNB 1103. From step 12 on, the UE 1101 is connected to the target eNB 1104.

The above mentioned steps and messages are examples and refer to several concepts that are independent of each other. Several of the messages may be seen to be optional or may not relate to a particular independent concept. Certain information may also be transferred in different ways or by including them in other messages.

Here, in the example of FIG. 11, the assisting eNB 1103 becomes the RRC anchor point in dual connectivity mode. According to the signaling in FIG. 11 the assisting eNB 1103 will take over the part of the RRC anchor during the RRC diversity mode of the UE 1101. This is requested in step 3. In step 6 an indication is sent from source to assisting eNB conveying the complete RRC context of the UE, sequence number and buffered packets, also including instructions to set up an RRC diversity mode with the anchor role in the assisting eNB 1103. The source eNB 1102 will take over the role of the RRC relay. It is immediately able to go on transmitting buffered RRC/PDCP PDUs to the UE 1101. Later on, in steps 9 and 10, the actual handover request/response handshake is done between assisting eNB 1103 and target eNB 1104. Also in this alternative, the UE context release is sent from target eNB 1104 towards the assisting eNB 1103 (step 15), and HO assistance stopping indication is transmitted from assisting eNB 1103 to source eNB 1102 in step 16.

Figure 12:
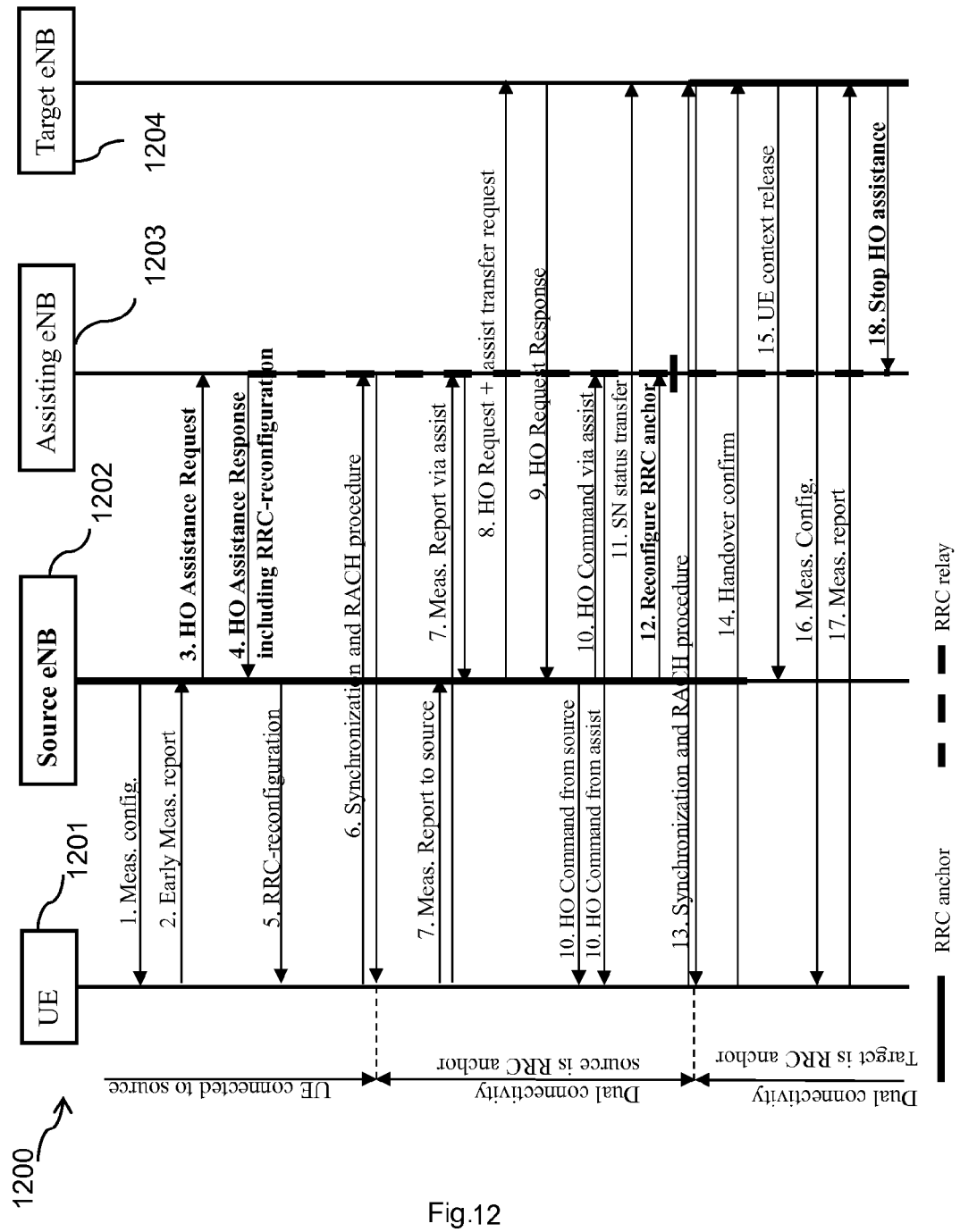
FIG. 12 shows a signaling diagram for illustrating a method according to an embodiment of the invention.

FIG. 12 shows another exemplary signaling diagram of a method according to an embodiment. In FIG. 12, a wireless network 1200 comprises a user equipment 1201, a source eNB 1202, a assisting eNB 1203, and a target eNodeB 1204. Steps in the signaling diagram of FIG. 12 are labelled by integer numbers. RRC anchor functionality is indicated by a bold solid line. RRV relay functionality is indicated by a bold dashed line. The different messages and steps are presented first, further aspects of the respective steps are described thereafter.

In FIG. 12, steps 1 to 7 correspond to steps 1 to 7 of FIG. 10. In step 8 a handover request and a request to transfer assistance is send from source eNB 1202 to target eNB 1204, which sends a Handover request response to the source eNB 1202. Steps 10 and 11 correspond to steps 9 and 10 of FIG. 10. In step 12, e message to reconfigure the RRC anchor is send from source eNB 1202 to assisting eNB 1203. Step 13, 14 and 15 corresponds to step 11, 12 and 13 in FIG. 10. In step 16, a measurement configuration is send from the target eNB 1204 to the UE 1201. In step 17, the UE 1201 sends a measurement report to the target eNB 1204. In step 18, the target eNB 1204 requests the assisting eNB 1203 to stop handover assistance.

In this example, up to step 6, the UE 1201 is connected to the source eNB 1202. From step 7 to 13, the UE 1201 is in dual connectivity, i.e. connected to source eNB 1202 and assisting eNB 1203. From step 12 on, the UE 1201 is connected to the target eNB 1204.

The above mentioned steps and messages are examples and refer to several concepts that are independent of each other. Several of the messages may be seen to be optional or may not relate to a particular independent concept. Certain information may also be transferred in different ways or by including them in other messages.

In the example of FIG. 12, the assisting eNB 1203 will remain an assisting eNB also after the handover to the target eNB 1204. For this purpose the source eNB 1202 will include—in this example—an assist transfer request in the HO request to the target cell in step 8, which is acknowledged by the handover request response in step 9. Alternatively, the source eNB 1202 can be configured to always assume this request to be acknowledged by the target eNB 1204, in this case the request is not necessary. In step 12, the source eNB 1202 sends an RRC anchor reconfiguration indication to the assisting eNB 1203, which will upon reception regard the target eNB 1204 as the RRC anchor it is assisting. The handover command prepared in the target eNB 1204 and sent from source eNB 1202 to the UE 1201 is in this alternative an RRC-reconfiguration configuring the UE 1201 to change the dual connectivity from source eNB 1202 to target eNB 1204 but maintain the connection to the assisting eNB 1203.

The release of the assisting eNB 1203 can be based on a configured measurement report from the UE (e.g. steps 16 and 17) as shown in the FIG. 12. Alternatively, the assisting eNB 1203 can remain until the radio connection fails for maximal diversity, until a timer runs out or another predefined event. The target eNB 1204 can trigger the assisting eNB 1203 to stop assistance by message according to step 18.

Assuming a system where not only RRC related messages are received and transmitted from/to the UE in a diversity connection via source and assisting eNB, but additionally user data traffic, for example VOIP packets, the connection of for this user data bearer needs to be maintained if the RRC anchor is switched from source to target eNB. Assuming that a data bearer is switched via the assisting eNB, it should be maintained in this state during the handover from source to target eNB. The legacy path-switch request from target to MME could include the information that the bearer to the assisting eNB should be maintained while other bearers should be switched. The maintaining can be indicated to the assisting eNB with the Reconfigure RRC anchor message (step 12).

Next, certain messages and information elements according to some embodiments are discussed.

The handover assistance request message exchange, i.e. handover assistance request and handover assistance response, provides a method to indicate to an eNB that handover assistance is requested and confirmed. The request would include information required to evaluate whether the receiving eNB could/would start RRC diversity for the UE, also the request needs to include the information for the receiving eNB to be able to establish RRC diversity. Moreover, the RRC diversity request can be a request to establish RRC relaying functionality in the receiving eNB or to establish RRC anchor functionality in the receiving eNB. The corresponding handover assistance response acknowledge message indicates if the eNB accepts the request and moreover includes a proposed RRC reconfiguration indication for the UE to be sent from the source cell to issue the UE to connect on both links.

In an embodiment the handover assistance request response messages can be regarded as modified versions of the HANDOVER REQUEST, HANDOVER REQUEST ACKNOWLEDGE, HANDOVER PREPARATION FAILURE messages specified in 3GPP TS 36.423 (e.g. V 11.3.0). In another embodiment the handover assistance messages can be regarded as new message types.

In one embodiment the handover assistance request response messages vary from the specified messages in 3GPP TS 36.423 (e.g. V 11.3.0) by a new field indicating that the handover assistance is requested rather than a full handover. Moreover, another field would indicate whether RRC relaying functionality or RRC anchor functionality is envisaged for the receiving eNB.

An exemplary modified version of the HANDOVER REQUEST message for the handover assistance request message may include one more or all of the fields given in the following. The message is sent by the source eNB to the potentially handover assisting eNB. The fields are: UE identifier in the sending eNB, Source and target cell identifier, UE RRC context, Field stating if RRC relaying or RRC anchor functionality is requested, Optionally as a decision basis for the acknowledgement in the receiving eNB, Measurement reports by UE or E-UTRA for multiple cells, Channel quality indicators (CQIs) by UE or E-UTRA for multiple cells, New indicator set by the source eNB rating the urgency of the request, Field stating the expected time the handover assistance will take can be included.

The handover assistance request acknowledge message modified from the HANDOVER REQUEST ACKNOWLEDGE message should at least include UE identifier in receiving and optionally sending eNB should include the RRC handover command message to be forwarded to the UE. This message is sent by the potential assistance eNB to inform the source eNB about acknowledgement of the assistance request.

The negative handover assistance request-acknowledge message modified from the HANDOVER PREPARATION FAILURE message is sent by the potential assistance eNB to inform the source eNB about not acknowledging the assistance request. The message may include a UE identifier known by the receiving eNB.

Here it is focused on switching the RRC anchor. In one embodiment, the assistance eNB accepting and acknowledging the request to become the RRC anchor will need additional information from the source eNB to establish the anchor functionality. This can be the case if the handover assistance request is implemented as a lightweight indication not including all information previously included in a full handover request. Moreover, the switch RRC anchor message may include information previously included in the sequence number status transfer message and may also include buffered data.

In an alternative this additional information would be included in the handover assistance request message.

Here it is focused on stopping the handover assistance. The handover assistance stop message indicates to the eNB acting as an RRC relay that handover assistance can be stopped for the indicated UE. This message can be regarded as a modified version of the UE CONTEXT RELEASE message or a new message type. It can include an information element identifying the UE in receiving as well as optionally in transmitting eNB.

Here, it is focused on a handover request including an assistance transfer request as discussed with respect to FIG. 12. A request to the target eNB to keep the assisting eNB for diversity also after the handover of the UE from source to target eNB can be included in a modified HANDOVER REQUEST message. This request may also include further details about the assisting eNB for the target eNB to make a decision. The response message modified from the HANDOVER REQUEST ACKNOWLEDGE message should then include an indication that the source eNB should issue the assisting eNB to regard the target eNB as its anchor eNB. The handover command to the UE within the modified HANDOVER REQUEST ACKNOWLEDGE message should issue the UE to connect from source to target cell but also to maintain the connection to the assisting eNB.

Here, it is focused on reconfiguration of an anchor indication as discussed with respect to FIG. 12. The source eNB indicates to the assisting eNB that the RRC anchor point changes for a certain indicated UE. The assisting eNB will then expect RRC messages for relaying from/to the indicated eNB instead of the previous source eNB.

In some embodiments, no duplication of the PDCP PDUs is required; instead all PDUs are transmitted via one of the links only. In this case all handover messages could be transmitted/received in the assisting node instead of the source node. Depending on whether the source node acts as the mobility anchor or not it will forward the PDCP PDUs to the anchor point.

In some embodiments, the assisting eNB will upon reception of the handover assistance request first ask the target eNB whether the UE is eligible for handover to this cell to avoid building up an RRC diversity state in vain. An "ask target eNB with cell ID for handover" flag could be added to the handover assistance request in this case.

In some embodiments, the procedure could start with a legacy handover acknowledgement handshake between source and target where an "ask assisting eNB for handover assistance" flag would be included in the handover request exchange. Optionally, the target eNB could decide itself to ask another eNB for handover assistance.

Another option is to maintain the booster role of the assisting eNB while moving the RRC anchor role from source to target eNB. This can be indicated in the message conveying the PDCP PDUs of the handover command via the assisting node.

As described, embodiments provide a solution to improve the handover performance (handover message exchange robustness) within a cellular network. Detailed description has been focused on LTE, while the general concept is applicable to other cellular networks such as GSM or UMTS. Since handover related message exchanges need to be performed at the cell border where the link quality to both source and target cell is poor, transmitting the handover related messages via a third node (possibly operating on a separate frequency) will improve the handover performance. Assuming dual-connectivity is established prior to the actual handover; the described method does not introduce additional transmission interruption delays. Moreover, network controlled handovers are enforced and UE based RRC-reestablishment procedures and their additional interruption time are avoided. The embodiments are especially advantageous in a heterogeneous network deployment, where handover between Pico cells might be more likely to fail and can occur very often.

Figure 13:
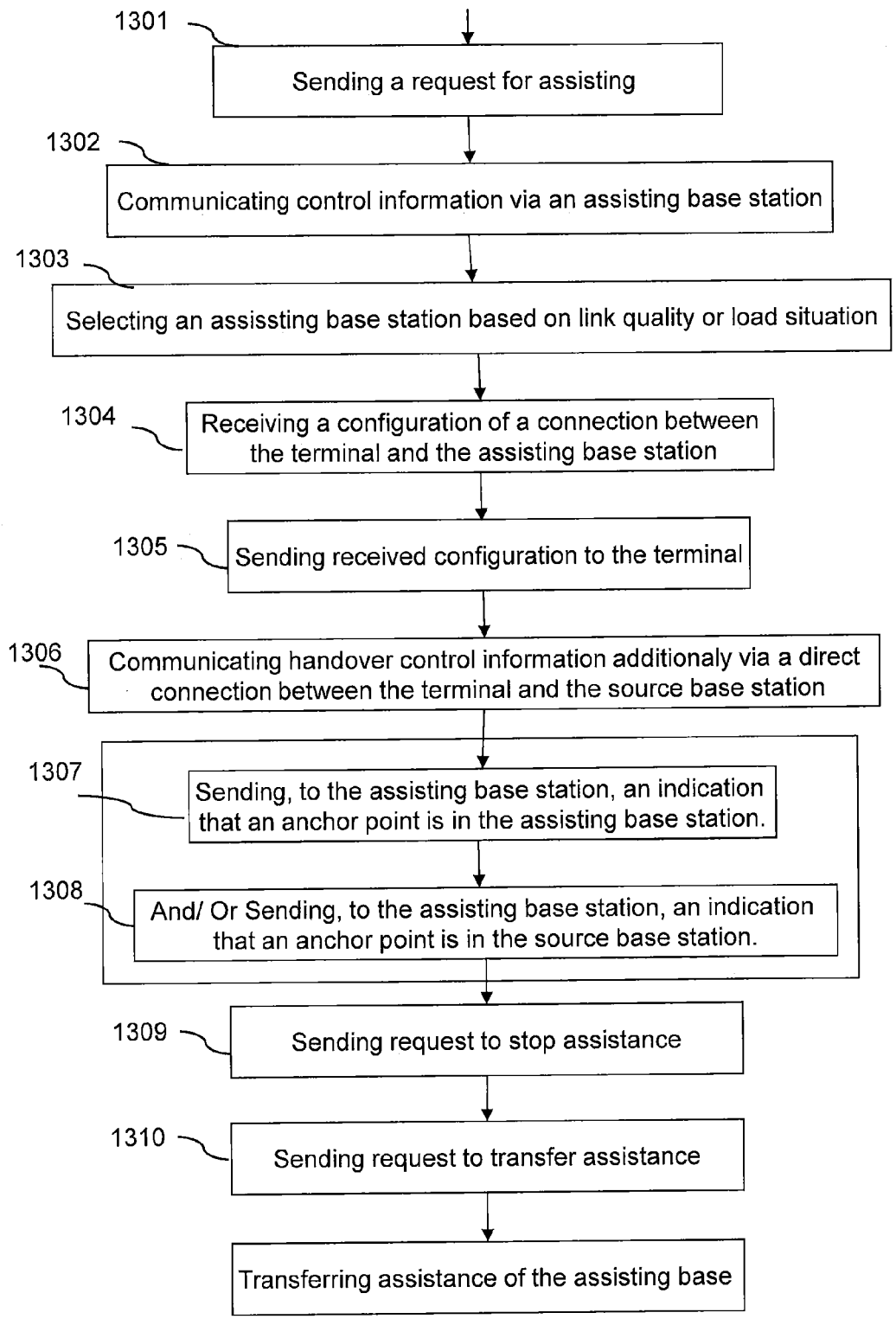
FIG. 13 shows a flowchart for illustrating a method in a base station according to an embodiment of the invention.

FIG. 13 sows a flowchart of a method in a base station according to an embodiment. The base station is acting as a source base station and supports a handover of a terminal from the source base station to a target base station. In step 1301, a request for assisting the handover is send. Examples of a request for assisting are the Handover Assistance Request (step 3) in FIG. 10, FIG. 11 and FIG. 12.

In a step 1302, handover control information is communicated between the terminal and the source base station via the assisting base station. For example, handover control information is in a measurement report or a handover command. Examples of a measurement report is in FIG. 10, step Measurement Report, in FIG. 11, step 8, Measurement Report via source, and in FIG. 12, step 7 Measurement Report via assist. Examples of a handover command are in FIG. 10, step 9 Handover command via assist, in FIG. 11, step 11 Handover command via source, and in FIG. 12, step 10 Handover command via assist. So the communicating step can comprise communication from the terminal to the source base station via the assisting base station, such as a measurement report, and/or communication from the source base station to the terminal via the assisting base station, such as a handover command. In principle, the roles of the assisting base station and the source base station may switch as discussed e.g. with respect to FIG. 11.

Some embodiments below also conceptually focuses on the switching of anchor points. For example, the step according to which an indication that an anchor point of control signaling for the terminal is to be established in the assisting base station is sent to the assisting base station may be performed. This normally effect that the roles of the source base station and the assisting base station are with respect to the communication of handover control signaling are exchanged.

In an optional step 1303, the assisting base station is selected on the basis of a link quality between the terminal and the assisting base station and/or a load situation. Typically the optimal assisting base station is selected from a set of candidate assisting base station according to one or more criteria such as the mentioned link quality and load situation.

In an optional step 1304, a configuration of a connection between the terminal and the assisting base station is received from the assisting base station (neighboring base station) in response to the request for assisting. Examples of a message including this information may be the handover assistance response as discussed with respect to step 4 of FIGS. 10, 11 and 12.

In an optional step 1305, the received configuration to the terminal for configuration of the connection between the terminal and the assisting base station (neighboring base station) is send to the terminal. Examples are e.g. further discussed with respect to step 5 of FIGS. 10,11 and 12.

In an optional step 1306, the handover control information is additionally communicated via a direct connection between the terminal and the source base station. E.G. the handover control information is also send via an air interface between the terminal and the source base station.

In an optional step 1307, an indication that an anchor point of control signaling for the terminal is in the source base station is send to the assisting base station.

In an alternative optional step 1308, an indication that an anchor point of control signaling for the terminal is to be established in the assisting base station is send to the assisting base station. Examples of this concept are e.g. further discussed with respect to step 6 in FIG. 11.

In an optional step 1309 a request to stop assistance is send to the assisting base station. Examples are step 14 in FIG. 10, step 16 in FIG. 11 step 18 in FIG. 12.

In an optional step 1310, a request to transfer assistance of the assisting base station from the source base station to the target base station is send to the target base station.

According to this concept, the assisting base station may first assist the source base station and then the target base station.

Figure 14:
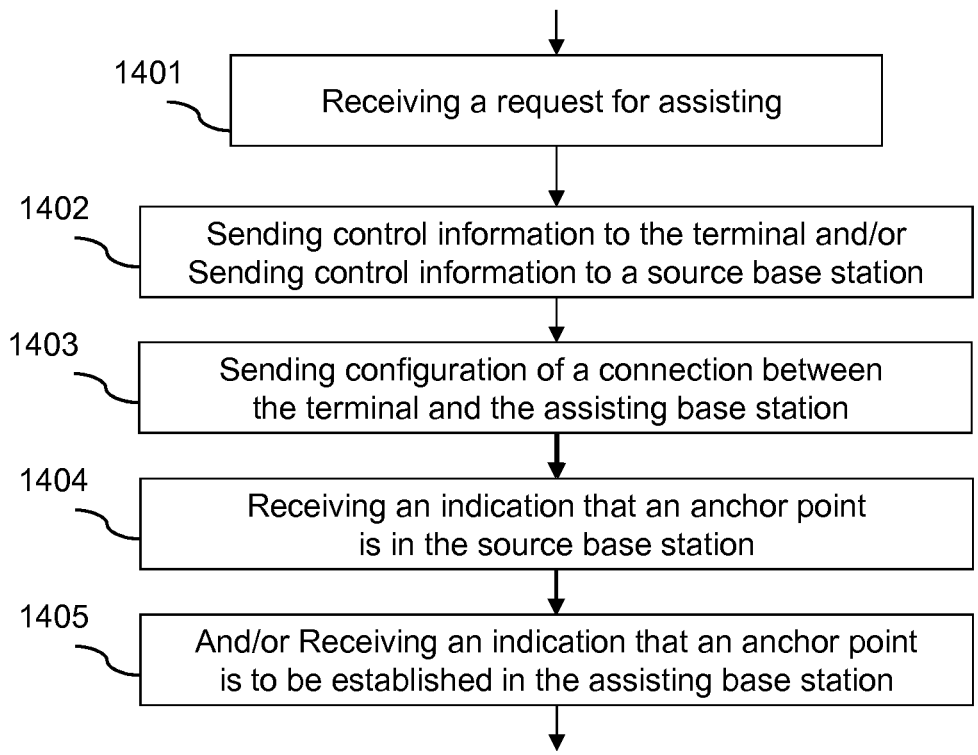
FIG. 14 shows a flowchart for illustrating a method in a base station according to an embodiment of the invention.

FIG. 14 shows a flowchart of a method in a base station according to an embodiment. The base station is acting as assisting base station and supports handover of a terminal from a source base station to a target base station. In step 1401, the assisting base station receives, from a source base station, a request for assisting the handover. In step 1402, handover control information, such as a handover command, received from the source base station is send to the terminal. This is normally done in case of a positive handover decision. Additionally or alternatively, handover control information, such as a measurement report, received from the terminal is sent to the source base station.

In an optional step 1403, in response to the request for assisting, a configuration of a connection between the terminal and the assisting base station for conveying to the terminal is send to the source base station.

In an optional step 1404, an indication that an anchor point for control signaling for the terminal is in the source base station is received from the source base station.

In an optional step 1405, an indication that an anchor point for control signaling for the terminal is to be established in the assisting base station is received from the source base station.

Figure 15:
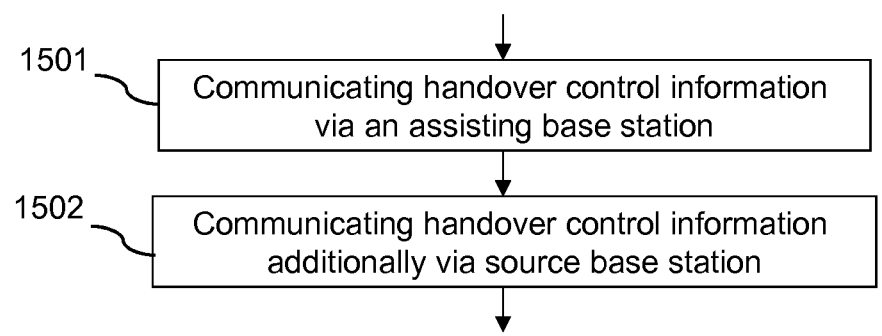
FIG. 15 shows a flowchart for illustrating a method in a terminal according to one embodiment.

FIG. 15 shows a flowchart of a method in a terminal according to one embodiment. The terminal is configured for communicating with a source base station and an assisting base station. The terminal supports handover of the terminal from the source base station to a target base station. Normally, the terminal is connected to the source base station and the assisting base station. In step 1501, handover control information is communicated between the terminal and the source base station via the assisting base station. For example, a handover command from the source base station is received via the assisting base station or a measurement report is sent to the source base station via the assisting base station.

In an optional step 1502, handover control information is additionally communicated via a direct connection between the terminal and the source base station.

It is to be noted that embodiments described with respect to FIG. 13, FIG. 14 and FIG. 15 are interrelated in the sense that they are described from a perspective of the source base station, the assisting base station and the terminal respectively.

Figure 16:
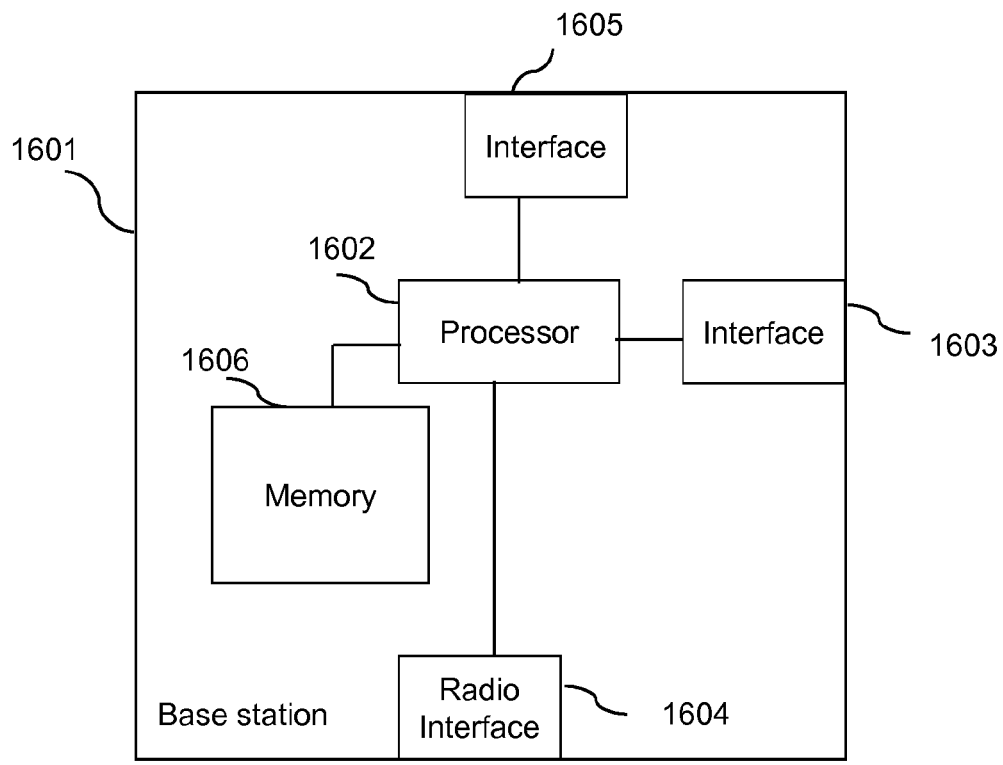
FIG. 16 schematically illustrates a base station according to an embodiment of the invention.

FIG. 16 schematically illustrates exemplary structures for implementing the above-described concepts in a base station 1601, such as the concepts for supporting a handover. The base station 1601 can e.g. be configured to perform described methods in an assisting base station, in a source base station or a target base station. The base station 1601 comprises a processor 1602, an interface 1603, an interface 1605 and a radio interface 1604. The interface 1603 is for communicating with one or more further base stations, such as a source base station (e.g. an eNodeB), the target base station (e.g. a eNodeB) or the assisting base station (e.g. an eNodeB). The radio interface 1604 is for connecting via an air interface to one or more terminals (UEs) (not shown in FIG. 16). The interface 1605 may be an interface to a core network. The processor 1602 is coupled to a memory 1606.

The memory 1606 may include a Read Only Memory (ROM), e.g., a flash ROM, a Random Access Memory (RAM), e.g., a Dynamic RAM (DRAM) or Static RAM (SRAM), a mass storage, e.g. a hard disk or solid state disk, or the like. The memory 1606 includes suitable configured program code to be executed by the processor 1606 so as to implement the above described functionalities of the base station 1601. More specifically, the memory 1606 may include a control module not explicitly depicted in FIG. 16) for controlling the sending, receiving or processing of messages or for controlling the communication of handover control information.

It is to be understood that the structure as illustrated in FIG. 16 is merely schematic and that the base station 1601 may actually include further components which, for the sake of clarity, have not been illustrated, e.g., further interfaces or additional processors. Also, it is to be understood that the memory 1606 may include further types of program code modules, which have not been illustrated. For example, the memory 1606 may include program code modules for implementing typical functionalities of a base station, e.g., known functionalities of an eNodeB. According to some embodiments, also a computer program product may be provided for implementing concepts according to embodiments of the invention, e.g., a computer-readable medium storing the program code and/or other data to be stored in the memory 1601.

Figure 17:
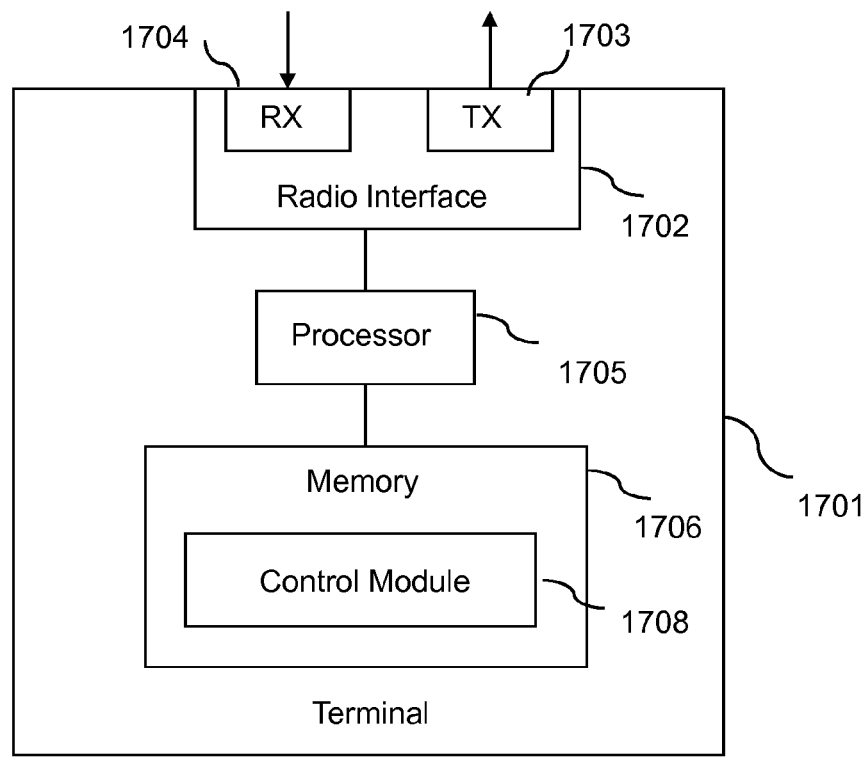
FIG. 17 schematically illustrates a terminal according to an embodiment of the invention.

FIG. 17 schematically illustrates exemplary structures for implementing the above-described concepts in a terminal 1701. In the illustrated structure, the terminal 1701 includes a radio interface 1702 for performing sending or receiving of data to or from base stations. Further, the terminal 1701 includes a processor 1705 coupled to the radio interface 1702 and a memory 1706 coupled to the processor 1705.

The memory 1706 may include a ROM, e.g., a flash ROM, a RAM, e.g., a DRAM or SRAM, a mass storage, e.g., a hard disk or solid state disk, or the like. The memory 1706 includes suitably configured program code to be executed by the processor 1705 so as to implement the above-described functionalities of the terminal/UE 1701. More specifically, the memory 1706 may include a control module 1708 for controlling the communication of handover control information.

It is to be understood that the structure as illustrated in FIG. 17 is merely schematic and that the Terminal 1701 may actually include further components which, for the sake of clarity, have not been illustrated, e.g., further interfaces or additional processors. Also, it is to be understood that the memory 1706 may include further types of program code modules, which have not been illustrated. For example, the memory 1706 may include program code modules for implementing typical functionalities of a Terminal or UE or program code of one or more applications to be executed by the processor 1705. According to some embodiments, also a computer program product may be provided for implementing concepts according to embodiments of the invention, e.g., a computer-readable medium storing the program code and/or other data to be stored in the memory 1706.

Modifications and other embodiments of all disclosed embodiments will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a source base station for supporting a handover of a terminal from the source base station to a target base station, the method comprising:
   Sending, by the source base station to an assisting base station, a request for assisting the handover;
   Receiving, in response to the request for assisting, by the source base station from the assisting base station, a configuration of a connection between the terminal and the assisting base station;
   Sending, by the source base station, the received configuration to the terminal for configuration of the connection between the terminal and the assisting base station; and
   Communicating handover control information between the terminal and the source base station via the assisting base station.

2. The method according to claim 1, further comprising:
   Selecting the assisting base station based on a link quality between the terminal and the assisting base station and/or a load situation.

3. The method according to claim 1, further comprising:
   Communicating the handover control information additionally via a direct connection between the terminal and the source base station.

4. The method according to claim 1, further comprising:
   Sending, to the assisting base station, an indication that an anchor point of control signaling for the terminal is in the source base station.

5. The method according to claim 1, further comprising:
   Sending, to the assisting base station, an indication that an anchor point of control signaling for the terminal is to be established in the assisting base station.

6. The method according to claim 1, further comprising:
   Sending, to the assisting base station, a request to stop assistance.

7. The method according to claim 1, further comprising:
   Sending, to the target base station, a request to transfer assistance of the assisting base station from assisting the source base station to assisting the target base station; and
   Assisting, by the assisting base station, in response to the request to transfer assistance, the target base station.

8. A computer program product comprising a non-transitory computer readable storage medium storing computer program code to be executed by at least one processor of a base station, wherein the execution of the computer program code by the at least one processor causes the base station to perform the method of claim 1.

9. The method according to claim 1, wherein the configuration of the connection between the terminal and the assisting base station, that is received by the source base station from the assisting base station in response to the request for assisting, comprises an RRC reconfiguration indication for the terminal.

10. The method according to claim 1, wherein the communicating the handover control information via the assisting base station is performed in response to successfully receiving the configuration by the source base station from the assisting base station.

11. A method in an assisting base station for supporting a handover of a terminal from a source base station to a target base station, the method comprising:
   Receiving, by the assisting base station from a source base station, a request for assisting the handover; and
   Sending, in response to the request for assisting, from the assisting base station to the source base station, a configuration of a connection between the terminal and the assisting base station for conveying to the terminal;
   Receiving, by the assisting base station from the source base station, first handover control information;
   Sending, from the assisting base station to the terminal, the first handover control information received from the source base station;
   Receiving, by the assisting base station from the terminal, second handover control information; and
   Sending, to the source base station, the second handover control information received from the terminal.

12. The method according to claim 11, further comprising:
   Receiving, from the source base station, an indication that an anchor point for control signaling for the terminal is in the source base station.

13. The method according to claim 11, further comprising:
   Receiving, from the source base station, an indication that an anchor point for control signaling for the terminal is to be established in the assisting base station.

14. The method according to claim 11, wherein the configuration of the connection between the terminal and the assisting base station, that is received by the source base station from the assisting base station in response to the request for assisting, comprises an RRC reconfiguration indication for the terminal.

15. The method according to claim 11, wherein the handover control information is received by the assisting base station from the source base station in response to successfully receiving the configuration by the source base station from the assisting base station.

16. A method in a terminal configured for communicating with a source base station and an assisting base station, for supporting a handover of the terminal from the source base station to a target base station, the method comprising:
   Receiving, by the terminal from the source base station, a configuration of a connection between the terminal and the assisting base station, wherein the configuration is received by the source base station from the assisting base station in response to a request for assisting; and
   Communicating handover control information between the terminal and the source base station via the assisting base station.

17. The method according to claim 16, further comprising:
   Communicating handover control information additionally via a direct connection between the terminal and the source base station.

18. A computer program product comprising a non-transitory computer readable storage medium storing computer program code to be executed by at least one processor of a terminal, wherein the execution of the computer program code by the at least one processor causes the terminal to perform the method of claim 16.

19. The method according to claim 16, wherein the configuration of the connection between the terminal and the assisting base station, that is received by the source base station from the assisting base station in response to the request for assisting, comprises an RRC reconfiguration indication for the terminal.

20. The method according to claim 16, wherein the communicating the handover control information via the assisting base station is performed in response to successfully receiving the configuration by the source base station from the assisting base station.

21. A source base station for supporting a handover of a terminal from the source base station to a target base station, comprising:
   a radio interface for communicating with the terminal;
   an interface for communicating with a target base station and an assisting base station; and
   a processor configured to control:
      Sending, to an assisting base station, a request for assisting the handover;
      Receiving, in response to the request for assisting, from the assisting base station, a configuration of a connection between the terminal and the assisting base station;
      Sending the received configuration to the terminal for configuration of the connection between the terminal and the assisting base station; and
      Communicating handover control information between the terminal and the source base station via the assisting base station.

22. An assisting base station for supporting a handover of a terminal from a source base station to a target base station, comprising:
   a radio interface for communicating with one or more terminals;
   an interface for communicating with one or more base stations; and
   a processor configured to control:
      Receiving, from a source base station, a request for assisting the handover;
      Sending, in response to the request for assisting, to the source base station, a configuration of a connection between the terminal and the assisting base station for conveying to the terminal;
      Receiving, from the source base station, first handover control information;
      Sending, to the terminal, the first handover control information received from the source base station;
      Receiving, from the terminal, second handover control information; and
      Sending, to the source base station, the second handover control information received from the terminal.

23. The assisting base station according to claim 22, wherein the processor is further configured to receive, via the interface from the source base station, an indication that an anchor point for control signaling for the terminal is in the source base station.

24. The assisting base station according to claim 22, wherein the processor is further configured to receive, via the interface from the source base station, an indication that an anchor point for control signaling for the terminal is to be established in the assisting base station.

25. A terminal comprising:
   a radio interface for connecting to one or more base stations; and a processor configured to control:
      Receiving, from a source base station, a configuration of a connection between the terminal and an assisting base station, wherein the configuration is received by the source base station from the assisting base station in response to a request for assisting; and
      Communicating handover control information between the terminal and the source base station via an assisting base station.

26. The terminal according to claim 25, wherein the processor is further configured to communicate handover control information additionally via a direct connection between the terminal and the source base station.

* * * * *